(12) United States Patent
Möhring (10) Patent No.: US 7,276,810 B2
(45) Date of Patent: Oct. 2, 2007

(54) WIND POWER PLANT BASED ON THE WINDMILL PRINCIPLE WITH AN ADDITIONAL VANE BEARING AT THE VANE END

(76) Inventor: Manfred Möhring, Oststrasse 25, Gotha (DE) D-99867

( * ) Notice: Subject to any disclaimer, the term of this patent is extended or adjusted under 35 U.S.C. 154(b) by 0 days.

(21) Appl. No.: 11/588,137

(22) Filed: Oct. 26, 2006

(65) Prior Publication Data
US 2007/0075549 A1 Apr. 5, 2007

Related U.S. Application Data

(63) Continuation of application No. PCT/EP2005/004469, filed on Apr. 26, 2005.

(30) Foreign Application Priority Data
Apr. 28, 2004 (DE) .................... 10 2004 020 835

(51) Int. Cl.
*F03D 9/00* (2006.01)
*H02P 9/04* (2006.01)
(52) U.S. Cl. .......................... 290/55; 290/44
(58) Field of Classification Search .................. 290/54, 290/55, 44, 43; 416/132 B, 142, 153, 17, 416/11, 7; 415/4.3, 4.2, 2.1, 4.5, 907, 7
See application file for complete search history.

(56) References Cited

U.S. PATENT DOCUMENTS

| 74,687 | A | * | 2/1868 | Hidden | 415/4.2 |
| 1,183,219 | A | * | 5/1916 | Manikowske | 290/44 |
| 1,186,289 | A | * | 6/1916 | Dalen | 415/4.3 |
| 1,334,485 | A | * | 3/1920 | Clipfell et al. | 290/55 |
| 4,239,977 | A | * | 12/1980 | Strutman | 290/44 |
| 4,289,970 | A | * | 9/1981 | Deibert | 290/44 |
| 4,313,710 | A | * | 2/1982 | La Ferte | 415/4.2 |
| 4,417,853 | A | * | 11/1983 | Cook | 416/132 B |
| 4,508,972 | A | * | 4/1985 | Willmouth | 290/55 |
| 4,720,640 | A | * | 1/1988 | Anderson et al. | 290/43 |
| 5,302,084 | A | * | 4/1994 | Nelson | 416/17 |

(Continued)

FOREIGN PATENT DOCUMENTS

DE 3718954 12/1988

(Continued)

OTHER PUBLICATIONS

German Office Action dated Feb. 1, 2005.

(Continued)

*Primary Examiner*—Julio C. Gonzalez
(74) *Attorney, Agent, or Firm*—Jenkins, Wilson, Taylor & Hunt, P.A.

(57) ABSTRACT

The present invention concerns a wind power plant with a central rotor unit (1); a ring carrier element (2), which surrounds the central rotor unit (1) in a concentric configuration; and with several rotor vanes (3) which are fixed with a bearing to the rotor unit (1) and to the ring carrier element (2). The rotor vanes (3) are additionally pivoted on the bearing sections of the rotor unit (1) and on the ring carrier element (2) to enable rotations around their longitudinal axes, and to adjust them by control devices in the region of these bearing sections.

21 Claims, 6 Drawing Sheets

U.S. PATENT DOCUMENTS

| | | | | |
|---|---|---|---|---|
| 5,765,990 A | * | 6/1998 | Jones | 415/2.1 |
| 5,855,470 A | * | 1/1999 | Holmes | 416/11 |
| 6,064,123 A | | 5/2000 | Gislason | |
| 2005/0175456 A1 | * | 8/2005 | Uphues et al. | 416/132 B |
| 2006/0275121 A1 | * | 12/2006 | Merswolke et al. | 416/132 B |

FOREIGN PATENT DOCUMENTS

| | | |
|---|---|---|
| DE | 10014426 | 10/2001 |
| DE | 20213062 | 11/2002 |
| FR | 2394689 | 1/1979 |

OTHER PUBLICATIONS

PCT International Search Report Form PCT/ISA/220 dated Aug. 3, 2005.

PCT International Search Report Form PCT/ISA/210.

PCT International Search Report/Written Opinion Form PCT/ISA/237.

\* cited by examiner

WIND POWER PLANT BASED ON THE WINDMILL PRINCIPLE WITH AN ADDITIONAL VANE BEARING AT THE VANE END

RELATED APPLICATIONS

This application is a continuation of PCT International Patent Application No. PCT/EP2005/004469, filed Apr. 26, 2005, which claims priority to German Patent Application No. 102004020835.2, filed Apr. 28, 2004, the disclosures of each of which are incorporated herein by reference in their entirety.

The present invention concerns a wind power plant based on the principle of the windmill, which can be used for power supply purposes.

Although the present invention can be applied to any wind power plant, its features as well as the problems regarding a wind power plant are described for a large-scale construction.

STATE OF THE ART

Such wind power plants are suitable to cover a portion of the power required for all consumers. In the future, they will also serve to generate hydrogen through the hydrolysis of water in addition to oxygen. By means of fuel cells in cars, the hydrogen will replace the fuels used so far: gasoline, Diesel or natural gas. Furthermore, for the countries currently producing petroleum or natural gas, which at present are not living at a high level of technology, it is a vital question of maintaining their existence when their natural resources no longer exist, to install large-scale wind power plants with higher capacities based on their gains from their petroleum and natural gas business.

Worldwide, windmills with a horizontal axis have become widespread. Most of them have three rotor blades or rotor vanes situated on the rotor which subsequently transmits the energy generated by wind power to the small power house with transmission, brake device, generator and control device. The installations are situated on towers with a rotating assembly and are operated by control equipment.

In view of the overproduction of electricity from nuclear power plants and plants with fossil fuels, the current three-wing wind power plants are used only to a certain extent, that means, upon request of the power companies they are sometimes switched off, although there is sufficient wind energy. Already today, it would be necessary to take the entire energy from wind power plants, to store it for a certain time or to transfer it into energy sources such as hydrogen. The methods used so far should be obsolete when large-scale wind power plants exist. In view of the imminent end of the world resources of carbon and hydrocarbons, the use of carbon, petroleum and natural gas for thermal purposes, including nuclear power plants, should be prohibited by international conventions. This prohibition should be enforced so that the international chemical industry and the metallurgical companies have these important resources at their disposal for a long period of time. In this case current from alternative and renewable energy will be the most important source of energy. Large-scale wind power plants of the mentioned magnitude can serve as a significant support to the necessary re-arrangement of the world energy consumption.

Although the wind power plants presently installed in Germany generate a considerable amount of energy, but altogether the portion of alternative energies (from wind, water and sun) amount to only 10% of the total electricity consumed in Germany.

Regarding the installed state-of-the-art three-wing wind power plants, the fact of their low performance has turned out to be a disadvantage: The wing surface exposed to the wind is 60 m$^2$ only.

The state of the art offers an approach to the solution: The performance of the three-wing wind power plants can be increased by enlarging the dimensions of the rotor vanes in length and width.

However, this approach implies the negative effect that the current composite materials such as fibre optics and synthetic resin do not permit to considerably augment the dimensions of the rotor vanes because the weight increase is disadvantageous concerning the stability. The possibility to increase the width of the wings at the pointed part fails as well regarding the stability requirements because here, too, a considerable weight increase is to be expected.

The state of the art also offers the possibility to increase the number of rotor vanes in order to augment the performance based on a higher acceptance of wind energy.

In this case the fact proved to be negative that, due to the large diameter of the rotor blades' base plate, only a limited number of wings, usually three, can be mounted onto the rotor. The present models do not permit an enlargement of the rotor.

Definition of the Problem

Therefore it is the task of the present invention to create a wind power plant with an increased performance as a result of more wind acceptance on the basis of the state of the art.

This problem is solved by a wind power plant with the characteristics of the patent claim 1.

The idea on which the present invention is based consists in the following design of the wind power plant: It has a central rotor unit, a ring carrier element with a concentric configuration around the central rotor unit, and several rotor vanes which are pivoted for a circular movement on the rotor unit and the ring carrier element. Firstly, the rotor vanes are pivoted at the bearing sections of the rotor unit and at the ring carrier element around the longitudinal axes. To adjust the wings, they can be controlled synchronously in the region of the mentioned bearing sections. In this way a solid bearing section is created for the distal end of the rotor vane or the rotor vane heads, which are pivoted to enable circular movements around the rotor unit. Due to this additional bearing of the distal ends of the rotor vanes through the ring carrier element, the individual rotor vanes can be built with increased length, increased width and increased weight. Moreover, several rotor vanes can be provided with smaller ends and connected to the rotor unit because, contrary to the state of the art, the rotor unit is not forced to absorb the entire weight of the wings, thus a tapered bearing section is sufficient. Especially the width of the state-of-the-art ends of the rotor vanes can be enlarged considerably. Here, the number of wings can be duplicated, e.g. 20 times. Due to the mobile bearing of the wing ends on orbits and the firm guide by means of the ring carrier element, the weight forces of the individual rotor vanes are transmitted from the rotor unit to the ring carrier element.

Moreover, as a result of the pivot bearing on the sections of both the rotor unit and the ring carrier element, the rotor vanes can be adjusted individually around their longitudinal axes. A synchronous control is ensured by a control unit situated in the rotor unit and a control unit situated on the ring carrier element. In this way a wrong position or a wrong control is avoided.

A wind power plant as described above for the present invention has the advantage, compared to the plants of the state of the art, that the wing surface, depending on the number of rotor blades, varies between 20000 and 30000 $m^2$. This is 300 or 500 times more than the surface of the plants installed so far. In this way the performance of the entire wind power plant is considerably higher compared to the plants of the state of the art.

In the subclaims there are advantageous further developments and improvements of the wind power plant indicated in claim 1.

According to a preferred further development, each rotor vane is coupled at the distal bearing section in the region of the ring carrier element with spring device in favour of an elastic suspension. The spring device has the effect of a radial outward oriented tension of the corresponding rotor vane. The force of the spring device can be adjusted individually. In this way an elastic bearing of the rotor vanes is enabled in radial direction so that, regarding potential length modifications as a result of wind and temperature variations, the rotor vanes may be exposed to a certain deflection. In order to counteract such deflections, the spring elements exert a moderate tension on the corresponding rotor blade or the allocated rotor vanes.

According to another preferred example, the ring carrier element is designed in the form of a circular hollow-rail configuration so that the distal ends of the rotor vanes can be surrounded. An advantage is provided at the two sides of the ring-type hollow-rail by an endless roller chain situated in each hollow rail to guide the rotor vanes.

The distal ends of the rotor vanes are coupled through a connecting element to the bridge element. The bridge element is engaged with the two roller chains of the circular hollow-rail configuration for a synchronous guiding of the rotor vanes at the two sides of the hollow-rail configuration. For example, the connecting element must have a telescopic design to take up the corresponding spring device for the pretension of the rotor vane. Preferably the connecting element is mounted rotatably onto the bridge element to adjust the angle of attack of the corresponding rotor vane. To be able to adjust the angle of the rotor vanes, an outer control device is provided in the region of the distal bearing section to turn the connecting element for an adjustment of the rotor vanes. As an alternative the rotor vanes can have a common control device in the region of the distal bearing section, e.g. a control chain for a synchronous adjustment of the rotor vanes by synchronous turning of the connecting elements.

In another example, the proximal ends of the rotor vanes protrude into the rotor unit and are provided with a gearing. One common gear is evenly coupled with all teeth of the proximal ends of the rotor vanes so that the rotor vanes are synchronously adjusted. Here the common gear is controlled preferably by a common inner control device. Preferably the inner and outer control devices are coupled with each other so that synchronized control signals can be transmitted to the adjustment drives in order to ensure a synchronous adjustment of the rotor vanes at the two bearing sections.

According to another example, the wind power plant has several columns which engage at the ring carrier element and hold it in a stable position so that it is fixed. Preferably, the exterior columns should be inclined and the interior columns vertical. The base ends of the columns are designed in such a way that they enable rotations of the wind power plant around its vertical axis. This may be performed, for example, on a two-track rail system with sets of double wheels.

Sensors have the advantage of controlling the adjustments and rotations of the individual rotor vanes, the smooth running of the roller chains, the function of the energy output terminals, the functional capability of the used drive motors, gears etc. and, if necessary emit a warning signal or activate an emergency mechanism to stop the wind power plant.

According to a preferred embodiment, the wind power plant has several, most preferably four, energy output terminals which are provided at the distal ends of the rotor vanes at the ring carrier element. These points are preferably arranged in the region of the bearing of the columns at the ring carrier element.

Advantageous embodiments of the present invention are explained below with reference to the figures of the drawings. The figures show.

In the figures identical signs refer to identical components or identical functions.

Figure 1:
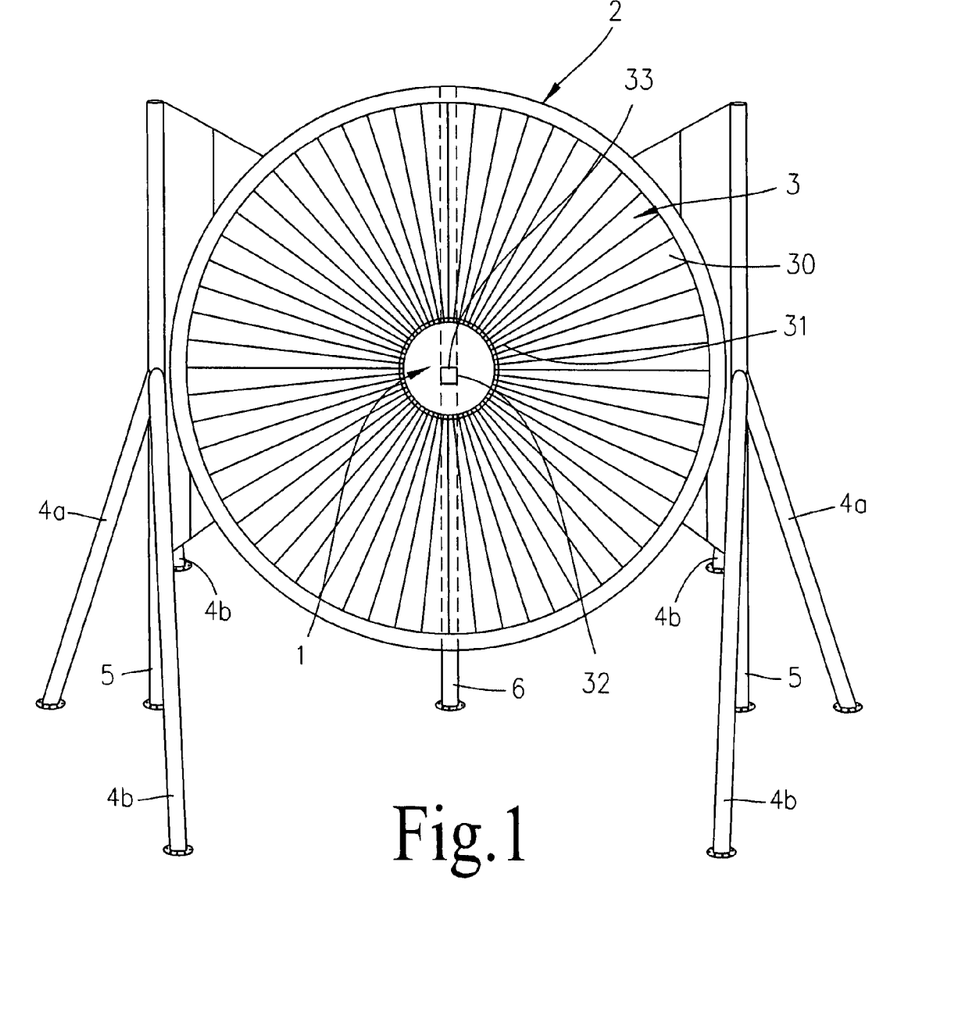
FIG. 1: Front view of a wind power plant based on an embodiment of the present invention.

FIG. 1 illustrates a front view of a wind power plant according to an embodiment of the present invention.

As can be seen in FIG. 1, the wind power plant of the present embodiment includes a central rotor unit 1 arranged in the middle and a ring carrier element 2, which is concentric with respect to the horizontal axis of the rotor unit 1 and which is preferably designed as a ring-shaped hollow-rail configuration, which is explained below in detail. Between the rotor unit 1 and the ring carrier element 2 there is a plurality of rotor vanes 3 m, which are supported at the rotor unit 1 via a bearing section 32 in the region 33 of the rotor unit 1 and at the ring carrier element 2 via a bearing section 34 (shown in FIG. 6) in the region of the ring carrier element 2. The ring-shaped rail arrangement or ring carrier element 2 encloses the distal ends 30 of all rotor vanes 3.

For example, there are between 60 and 100 rotor vanes 3 rotatably mounted to the rotor unit 1 so that during a rotation of the rotor unit 1 the rotor vanes 3 follow a circular path defined by the ring carrier element 2. The proximal ends 31 of the rotor vanes 3 are provided with gearing (not shown). Through a common control gear 36, all crown gears of the rotor vane ends are uniformly engaged and are adjustably supported e.g. by a common control mechanism (not shown), enabling an adjustment around the longitudinal axis of the rotor vanes 3 in a given direction and by a determined angle of attack. Common gear 36 is controlled by a common inner control device 37. This is explained in more detail below.

Figure 2:
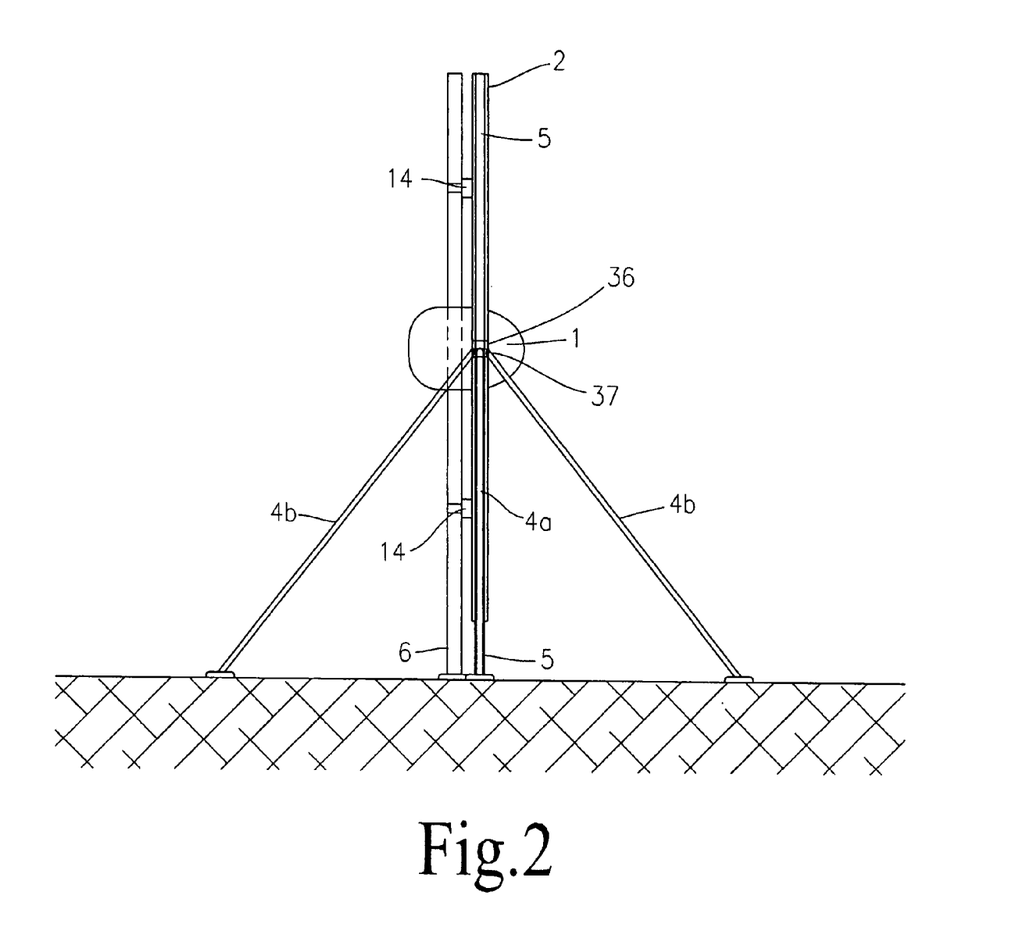
FIG. 2: Lateral view of the wind power plant in accordance with FIG. 1.
Figure 3:
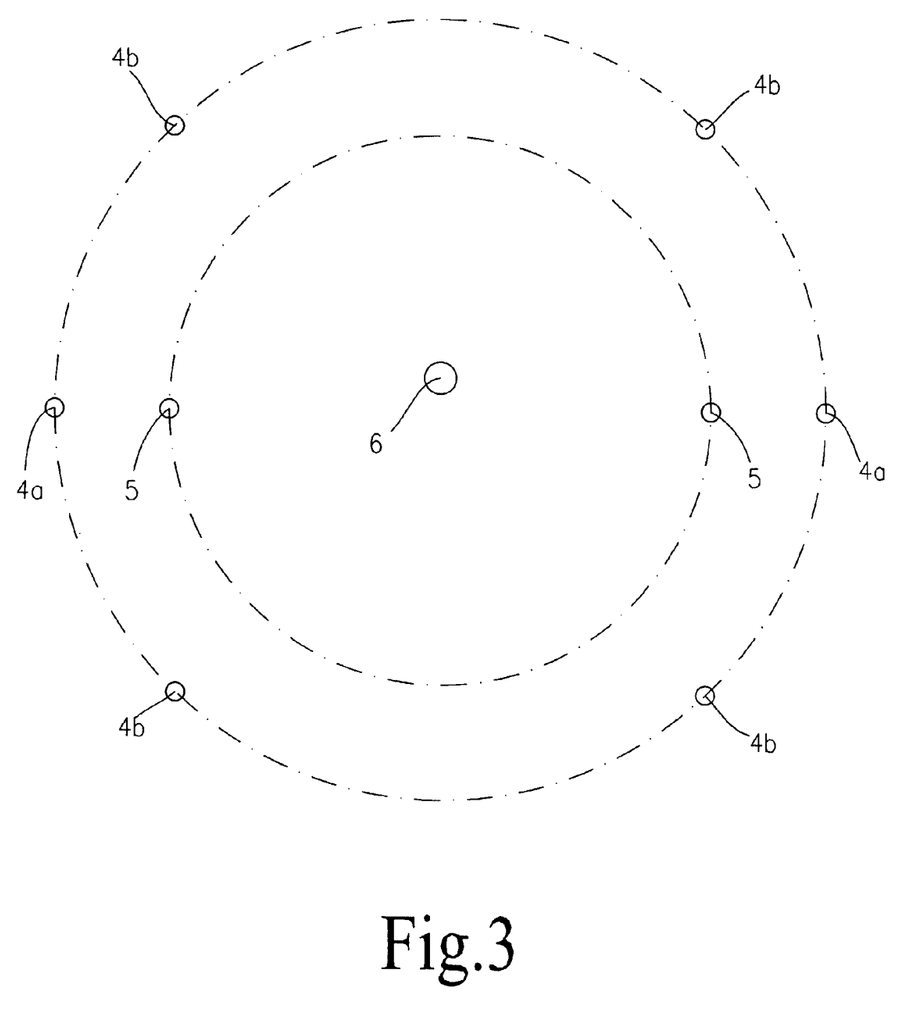
FIG. 3: Schematic top view of the floor-side arrangement of supporting and carrying columns in accordance with an embodiment of the present invention.

FIG. 2 illustrates a lateral view of a wind power plant according to FIG. 1 and FIG. 3 a schematic top view on a floor sided configuration of columns according to an embodiment of the present invention. The carrier system of the wind power plant according to an embodiment of the present invention shall be explained by means of FIG. 1, FIG. 2 and FIG. 3.

As can be seen in the figures, the arrangement including the rotor unit 1, the ring carrier element 2 and the rotor vanes 3 is carried by a system of columns. Preferably as can be seen in FIG. 3, six outer supporting columns 4, i.e. two lateral shorter ones 4*a* and four inclined longer ones 4*b*, which are oriented inclined toward the direction of the ring carrier element 2, are fixedly attached to the ring carrier element 2, for example, at the horizontal outer periphery of the ring carrier element 2. In addition, for example, two columns 5 which are oriented in vertical direction and which are also fixed at the ring carrier element 2, are also fixedly attached to the horizontal outer periphery of the ring carrier element 2. Furthermore, a standing column 6 is provided, which starting from a floor side bearing, extends in vertical direction centered with respect to the ring carrier element 2. At a lower intersection and an upper intersection, the standing column 6 is fixed to the ring carrier element and it is furthermore fixed with a housing section of the rotor unit 1.

The wind power plant or the ring carrier element 2 is supported via the column system, including the columns 4, 5 and 6, so that the wind power plant can rotate around its vertical axis in order to achieve the optimum exploitation of the wind force based on the adjustment to the current wind direction. The six outer supporting columns 4 are guided in a first circular special rail system 8 and the two carrying columns 5 are guided in a second concentric inner special rail system. This is explained below with reference to the FIG. 4 and FIG. 5.

Figure 4:
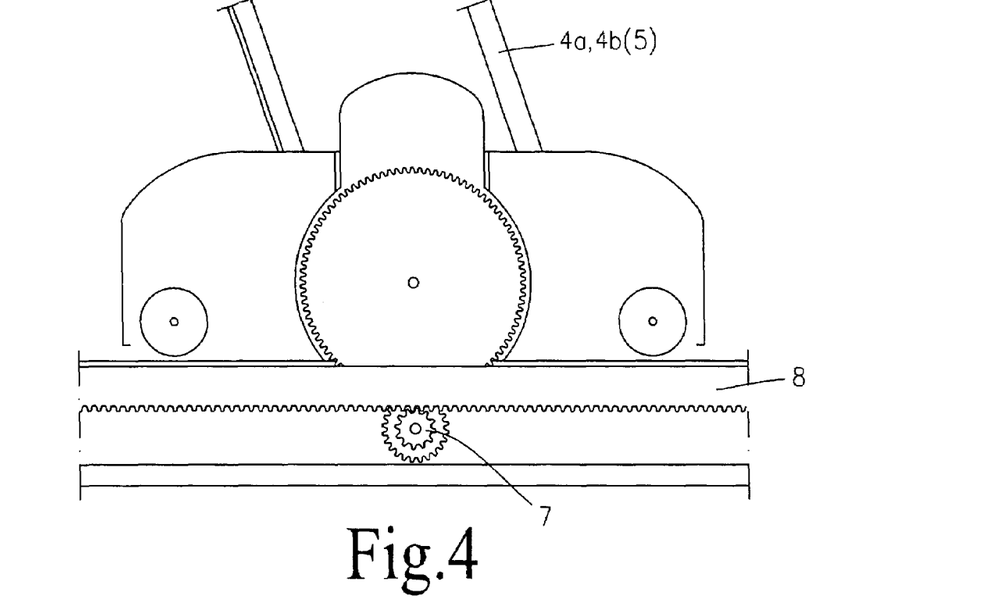
FIG. 4: Sectional view in longitudinal direction of a two-track railway for guiding and bearing of the column bases according to an embodiment of the present invention.
Figure 5:
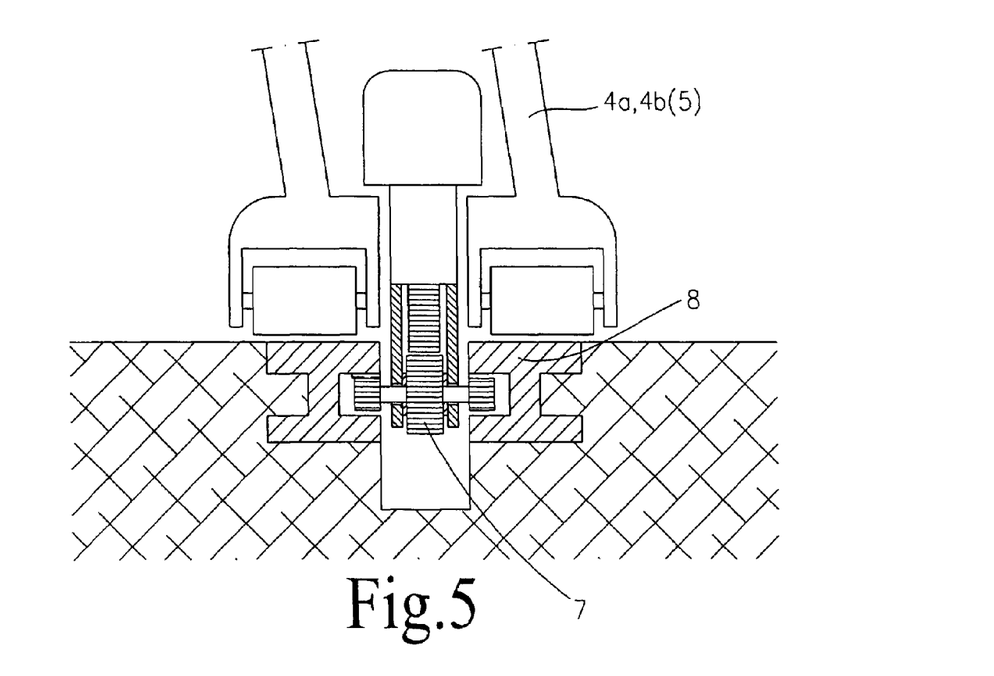
FIG. 5: Sectional view in cross direction of a two-track railway for guiding and bearing of the column bases according to an embodiment of the present invention.

FIG. 4 shows a sectional view along the longitudinal direction of a special rail system 8 in accordance with an embodiment of the present invention. FIG. 5 demonstrates a sectional view along the transverse direction of the special rail system 8 in FIG. 4. As can be seen in FIG. 4 and FIG. 5, the supporting columns 4 and the carrying columns 5 are arranged preferably on double wheel sets 7 which run on the respective two-track special rail systems 8. The special rail systems 8 can be anchored in a floor foundation.

Although the bearing principle and the guiding principle are represented in the figures by means of one supporting column 4, this principle can also be applied to the remaining columns 4 and the carrying columns 5.

The six supporting columns 4 can, for example, be moved on the outer special rail system 8 so that the entire wind power plant turns around its vertical axis. The center standing column 6 is preferably arranged on a turntable or the like. The smooth start of the wind power plant's movement can be effected by means of gear wheels which engage from below into the tooth profiles of the carrying rail pairs. Between the rail pairs there is a duct and above it a drive motor with brake and transmission. By driving the six supporting columns 4, it is also possible to drive the two carrying columns 5, for example, so that they do not need their own drive unit.

Figure 6:
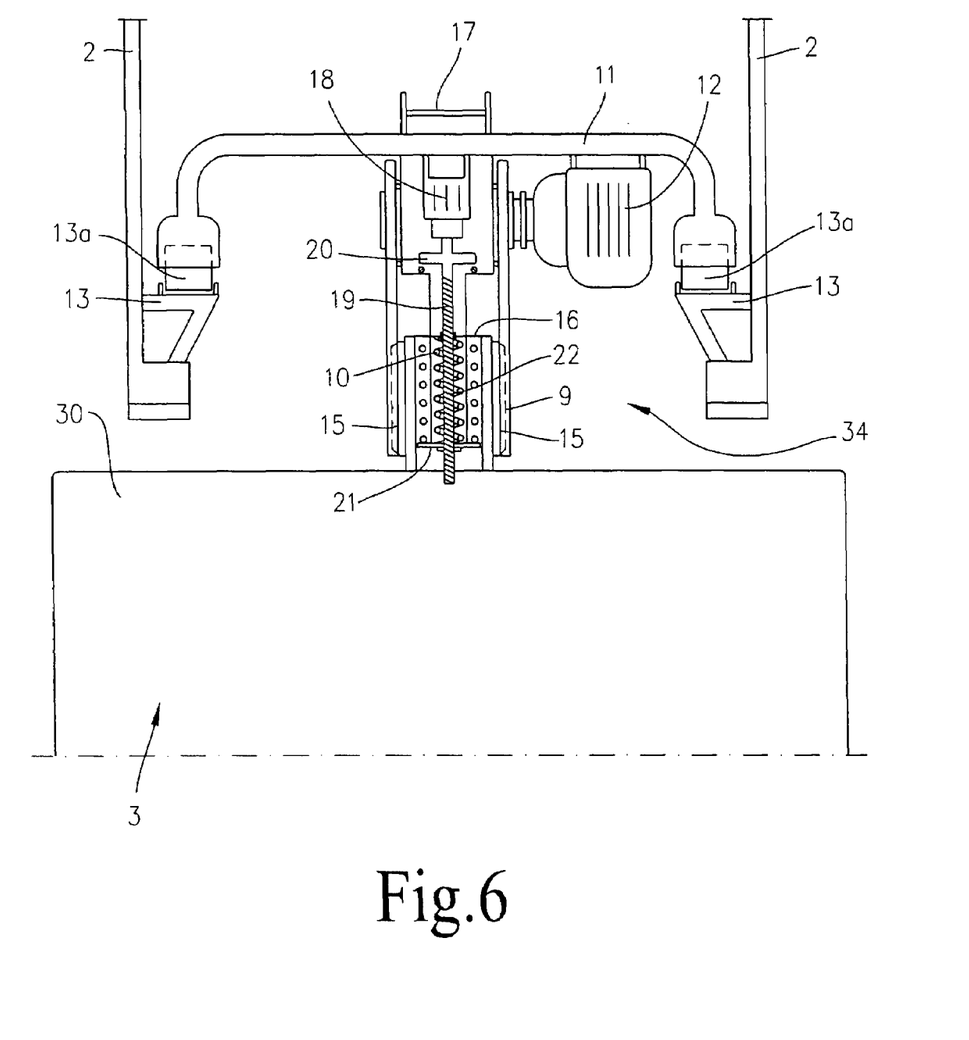
FIG. 6: Front view, partially as a cross section of a distal rotor vane end with corresponding bearing section and bridge element in hollow-rail arrangement according to an embodiment of the present invention.

Referring to FIG. 6, which illustrates a schematic view, partially as a section, of a distal rotor vane end including a suspension, below the bearing and the guidance of the distal rotor vane ends in the region of the ring carrier element 2 are explained in greater detail.

As can be understood from FIG. 6, the distal end 30 of each rotor vane 3 is preferably coupled with a connecting element 9 with telescopic cylinders which can be shifted in relation to each other by means of sliding rails 15. The telescopic cylinders are axially shiftable but cannot be turned radially with respect to each other. Moreover, there is a spring device 10, for example a spiral spring, so that the rotor vanes 3 are biased radially outwards by means of tension. In this way the individual rotor vanes 3 are elastically coupled with the ring carrier element 2 by the connecting element 9 comprising the spring device 10, so that any tensile forces, for example as a result of strong wind, can be absorbed by the spring device 10, thus providing protection for the ring carrier suspension. The spring device 10 may be arranged as a pressure spring under a rigid rotor vane head cover 16.

As can be seen in FIG. 6, a servo motor 18 is provided as a drive of a threaded spindle 19. The threaded spindle protrudes through a borehole below the support of a plate 20 and the borehole through the rotor-wing head-plate and can move freely. In the root platform 21 the threaded spindle 19 is seated with its threaded part 22 in the thread of the root platform 21, and can turn freely. The lose root platform 21 is hindered by means of grooves from turning in the sleeve, but it can move up and down in the cylinder sleeve by the rotating movement of the spindle 19. In case of pressure changes the lower part of the spring device must be able to move at least slightly into the direction of the fixed support through an adjustment of the device. The spring 10 exerts a different pressure onto the lower side of the rotor vane head.

The control device 12, which may be implemented as overall the control mechanism of all rotor vanes or of individual vanes, controls the cylinder sleeve for an angle adjustment of the rotor vane head as already explained.

The ring carrier element 2 is preferably an annular bridge configuration with two hollow rails 13 including endless running roller chains connected by a bridge arrangement 11. The bridge arrangement 11 is preferably supported by two hollow rails 13 within the ring carrier element 2, for example on endless running roller chains. Here, the connecting element 9 is preferably arranged in the center in relation to the bridge arrangement 11.

The annular ring carrier element 2 thus carries a roller chain with integrated plastic rollers 13*a* preferably on each side, which are connected by the bridge arrangement 11. The plastic rollers 13*a* may be designed as solid rollers or rollers with a hollow core made of steel and covered by a plastic coat. In this way the single plastic rollers 13*a* can be part of the roller chains and be suitable for a circular running in the guide rails or hollow rails 13. The two roller chains are connected by bridges at certain distances, depending on the distances between the vane heads. Here, the bridge arrangement 11 is connected with the roller chains by means of the rollers 13*a* or it is screwed onto them, preferably by means of a connection at the two sides of the roller.

In order to minimize the risk of a contamination of the roller conveyor, the plant can be provided with filtered air during the operation, wherein the air is produced in the energy stations. In this way an overpressure is created in the roller conveyor system to prevent contamination.

The connecting element 9 is attached to the bridge arrangement 11 in such a manner that the connecting element 9 can turn and thus the rotor vane can rotate around its longitudinal axis. Such an adjustment of the connecting element 9 or the rotor vane 3 can be made by means of a control device 12 coupled to the connecting element 9.

At this point of the description, it should be emphasized that instead of individual control devices 12, respectively associated with each rotor vane 3, a common control device, for example a control chain, may be used.

This type of construction is distributed in predetermined distances over the entire ring system. The ring system is preferably capsulated to prevent contamination by overlapping of the covering in the region of the moving rotor vane ends.

In order to ensure a synchronized adjustment or setting of each rotor vane 3 at the bearing section in the region of the ring carrier element 2 as well as at the bearing section in the region 33 of the rotor unit 1, the outer control devices 12 and the inner control unit (not shown) provided in the rotor unit 1 can be connected such that synchronized control signals for a synchronized adjustment of the angle of the individual rotor vanes 3 are ensured. In this way a misalignment or edging of individual rotor vanes 3 during its adjustment around the longitudinal axis can be avoided, which would result if a rotor vane 3 at the proximal end 31 was not adjusted in a synchronized way with the distal end 3.

Each rotor vane 3 is tensionally biased by an associated spring device 10. By means of a connecting element 9 it is suspended from the ring carrier element 2 so that it can rotate around its longitudinal axis. In this way the rotor vanes 3 can move in an orbit or circular path in addition to their possible adjustment around their longitudinal axes in relation to the ring carrier element 2.

In this way the rotor vanes 3 are aligned at the ends which protrude into the rotor unit 1 and at the suspension in the region of the roller chain bridge. As explained above, control devices serve for a synchronized alignment with uniform angles.

The spring device 10 is built in the corresponding cylindrical connecting element 9 with a predetermined spring force. It is possible to set the spring force by means of an adjusting screw to achieve the desired pressure.

Figure 7:
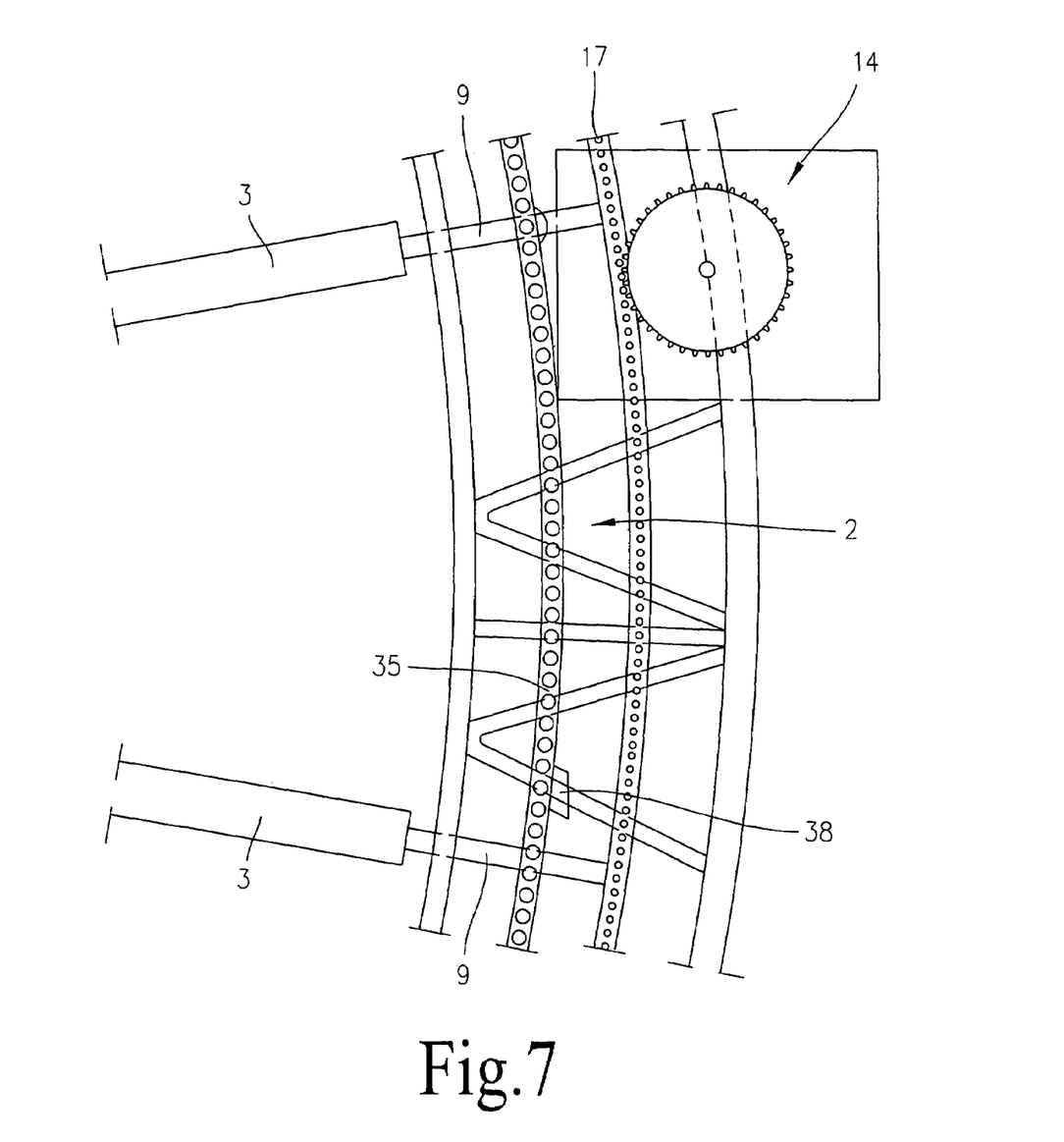
FIG. 7: Front view of a circular section of a wind power plant with allocated output terminal according to the present invention.

FIG. 7 illustrates a schematic view of a section of the ring carrier element 2 according to an embodiment of the present invention. As can be seen in FIG. 7, the wind power plant has at least one energy output terminal 14 including a transmission, a brake, a generator and control units.

Preferably, there should be several output terminals, for example, four, which is favourable from a static point of view. They should be arranged in the region of the lateral supporting structure of the ring carrier element 2 or in the distal end area 30 of the rotor vanes 3. For example, the four output terminals 14 may be arranged in the region of the bearing points, as can be seen in FIG. 2, between the supporting columns 4 and the ring carrier element 2. The energy may be retrieved by a semi-rigid pin chain 17 which extends over all distal ends of the rotor vanes 3. In addition, or as an alternative, a similar energy unit may be arranged in the guiding axis behind the rotor unit 1.

Positioning the output terminals 14 in the distal end area of the rotor vanes provides a favourable configuration because the angular speed increases towards the outer area of the rotor vanes and the dimensions of the single output terminals can be enlarged and can be provided more effectively and in greater number.

Preferably, sensors 38 are provided at all important points of the energy plant. These sensors 38 can monitor the operability of certain parts such as the setting of the rotor vanes or their orientation respectively, the spring pressure of the spring devices, the smooth running of the roller chains 35 the operability of the generators, the drive of the undercarriage and the brakes. Moreover, the entire equipment can be video controlled, and an acoustic control can be provided according to the strength and the sound segments. In this way a remote querying of all the data is possible. Any failure and alarm signals could be passed on to a central control system which may be able to inform the operator of the plant or an emergency mechanism so that the plant can be stopped.

In addition, a central control system can be provided so that, for example, the wind direction and speed can automatically or manually be measured, single steps of the starting process controlled after the determination of the conditions, and subsequently the rotor vanes brought from the idle position to the operating position, the thrust of the system is controlled by the generators and, after reaching the minimum number of revolutions switching the generators into operation. In case of a planned disconnection or a disconnection as a result of a failure, the required control signals are initiated so that the registration of the achieved power, the display, the collection and registration of messages from the sensors to all major functional parts of the plant are performed.

The rotor vanes 3 may have the shape of isosceles triangles, wherein the apices situated on the rotor unit have an angle of 10°. The rotor vanes 3 may be hollow like aircraft wings with the corresponding aerodynamic form and the corresponding inner structure.

The material may be light metal, including titanium. Moreover, composite materials such as synthetic resin, fiber optics or carbon fiber can be used. If the site is suitable, special canvas may be employed made of synthetic fibers with reinforcements and the possibility of inflatable tubes in the form of airfoils. Depending on the type of construction of the rotor vanes and the progress of solar technology, the rotor vanes may be designed accordingly.

Although the present invention so far has been described by means of preferred embodiments, it is by no means limited to these examples, but can be modified in various ways.

The three inner carrying columns 5 and 6 may accommodate elevators in which an operator can reach the generators. The present invention thus creates a wind power plant with an increased power output. By using all synergy effects, which essentially consist in an enlargement of the length and the width of the rotor blades, their number and special design features including the elastic end suspension, a higher energy exploitation per square meter compared to today's three-wing plants can be expected. Assuming that these wind power plants in the future will replace approximately 400 of the current windmills, the present total of 14000 windmills could be reduced to 28 in order to reach the same electrical power. The total cost for the use of 14000 windmills according to the state of the art amounts to approximately 21 billion Euros. This amount of money would be used up only partially.

The invention claimed is:

1. Wind power plant comprising:
   a central rotor unit;
   a ring carrier element concentrically surrounding the central rotor unit; and
   a plurality of rotor vanes, which are supported rotatably by the rotor unit and the ring carrier element to allow a circular revolution,
   wherein the rotor vanes are furthermore rotatably supported by bearing sections of the rotor unit and the ring carrier element to be rotatable around their longitudinal axes, wherein the rotor vanes can be controlled synchronously for adjustment by control devices in the region of these bearing sections, and wherein each rotor vane is coupled to a distal bearing section of the ring carrier element with a spring device for an elastic suspension causing a radially outward tensioning of the corresponding rotor vane.

2. Wind power plant according to claim 1, wherein the spring force of the spring devices is individually adjustable as desired.

3. Wind power plant according to claim 1, wherein the ring carrier element is arranged as an annular hollow rail arrangement surrounding the distal ends of the rotor vanes.

4. Wind power plant according to claim 3, wherein an endless roller chain in a corresponding hollow rail to guide the rotor vanes is arranged on both sides of the annular hollow rail arrangement.

5. Wind power plant according to claim 4, wherein the distal ends of the rotor vanes are connected by bridge arrangements through connecting elements, and that the bridge arrangements engage with the two roller chains to enable a synchronous guiding of the rotor vanes on the two sides of the hollow rail arrangement.

6. Wind power plant according to claim 5, wherein the connecting elements each receive the corresponding spring device for the pretensioning of the corresponding rotor vanes.

7. Wind power plant according to claim 5, wherein a telescopic design of the connecting elements to ensure an axial shifting of the rotor vanes by means of the spring device.

8. Wind power plant according to claim 5, wherein the connecting elements are rotatably attached to the bridge arrangement so that angle of attack of the rotor vanes can be adjusted.

9. Wind power plant according to claim 5, wherein the rotor vanes are provided with an outer control device in the region of the distal bearing section so that the angle of attack of the rotor vanes can be adjusted by turning the corresponding connecting element.

10. Wind power plant according to claim 5, wherein each of the rotor vanes is provided with one of the centrally controlled rotor blade motors of the system of all control motors of the plant in the region of the distal bearing sections.

11. Wind power plant according to claim 1, wherein the proximal ends of the rotor vanes project into the rotor unit and comprise gearing, wherein a common control gear is evenly coupled with all toothing of the proximal ends of the rotor vanes, such that the rotor vanes can be adjusted synchronously when the common control gear is driven.

12. Wind power plant according to claim 11, wherein the common control gear can be driven by an inner control device.

13. Wind power plant according to claim 9, wherein an inner and outer control devices are connected to each other to enable the supply of synchronous signals to the adjustment drives.

14. Wind power plant according to claim 1, comprising several columns engaging the ring carrier element and holding the ring carrier element in a stable position.

15. Wind power plant according to claim 14, that wherein the ring carrier element is held stationary by the columns.

16. Wind power plant according to claim 14, comprising outer inclined supporting columns and inner vertical carrying columns, wherein the base ends of the columns are guidably supported by a corresponding two-track rail system with sets of double wheels so as to enable rotation of the wind power plant around its vertical axis.

17. Wind power plant according to claim 1, comprising sensors which monitor the adjustment and rotation of the individual rotor vanes, the smooth running of the roller chains, the operability of the output terminals, the used drive motors, and the gearing, wherein the sensors, if necessary, emit a warning signal to an operator and/or activate an emergency mechanism to stop the wind power plant.

18. Wind power plant according to claim 1, wherein several energy output terminals, preferably four, in the region of the distal ends of the rotor vanes on the ring carrier element.

19. Wind power plant according to claim 18, wherein the energy output terminals are located in the region of the bearing sections of the supporting columns.

20. Wind power plant according to claim 1, comprising 60 to 100 rotor vanes.

21. Wind power plant according to claim 1, each rotor vane has been an axial length of at least 100 m.

* * * * *